(No Model.)
T. J. ERWIN.
PLOW.
No. 357,526. Patented Feb. 8, 1887.
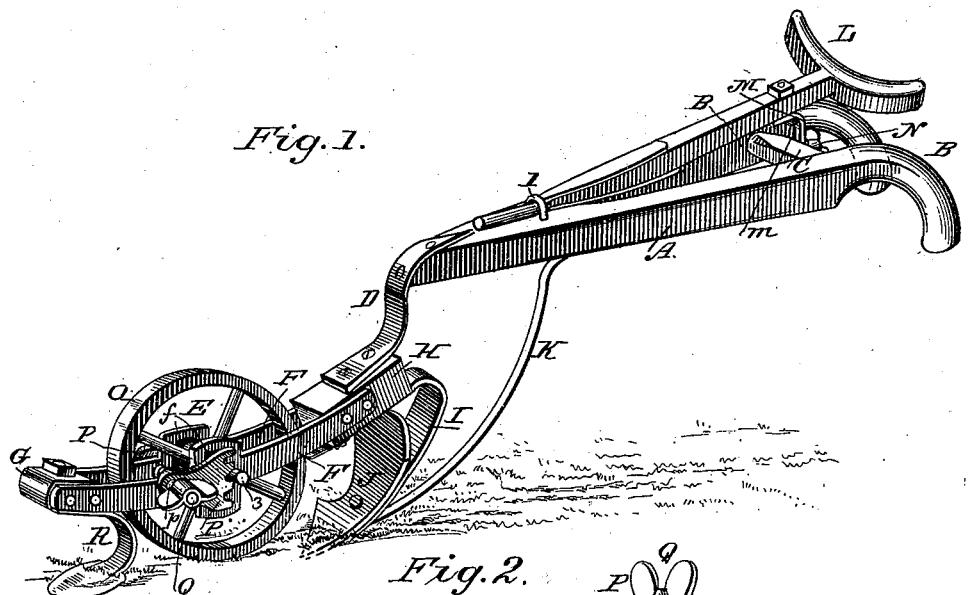
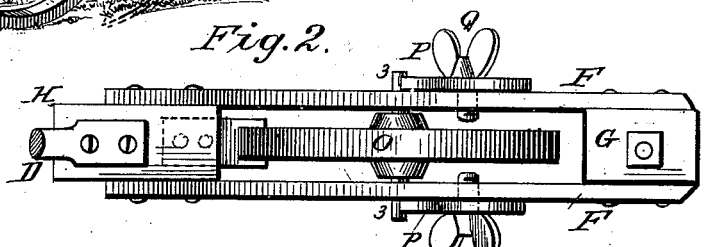
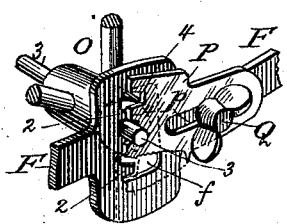
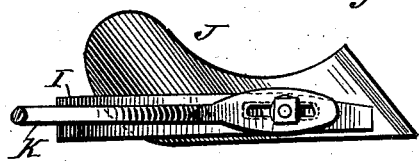
WITNESSES:
Fred G. Dieterich
P. B. Turpin
INVENTOR:
T. J. Erwin
BY Munn & Co.
ATTORNEYS.

UNITED STATES PATENT OFFICE.

THOMAS JEFFERSON ERWIN, OF UNION CHURCH, MISSISSIPPI.

PLOW.

SPECIFICATION forming part of Letters Patent No. 357,526, dated February 8, 1887.

Application filed December 7, 1886. Serial No. 220,933. (No model.)

*To all whom it may concern:*

Be it known that I, THOMAS JEFFERSON ERWIN, of Union Church, in the county of Jefferson and State of Mississippi, have invented a new and useful Improvement in Plows, of which the following is a specification.

My invention is an improved garden-plow, and aims, among other objects, to provide simple means for adjusting the gage-wheel to regulate the depth of the plow, a convenient construction and arrangement of the supporting-framing, and a breast-bar for pressure by the operator to increase the propelling power and to give the plowman a better control of the plow.

The invention consists in certain features of construction and novel combinations of parts, as will be described and claimed.

In the drawings, Figure 1 is a perspective view of the plow as in use. Fig. 2 is a top plan view of the front portion of same. Fig. 3 is a detail view illustrating the devices for adjusting the gage-wheel, and Fig. 4 is a bottom plan view of the mold-board and its supports.

The beam A has handles B, connected by cross-bar C. A bar, D, connects with the forward end of the beam and descends therefrom, being connected at its lower end to the rear block of the front frame, E. This frame consists of side bars, F, preferably curved, as shown, and end blocks, G and H, arranged between respectively the front and rear ends of said bars F.

To the rear block, H, is connected the plow-standard I, bearing the mold-board J on its lower end, and this mold-board is further supported by the brace-rod K, extended rearwardly from said mold-board and secured at its rear upper end to beam A. This brace, it will be seen, not only aids to support the mold-board or shovel J, but also supplements the bar D in supporting the front frame securely in position. The mold-board or shovel is secured to the standard and the brace-rod by a bolt, and for the purposes of adjustment this bolt preferably passes through slots formed longitudinally in said standard and brace-rod, as shown in Fig. 4.

On the handles I support the breast-bar L, the same being curved to conform approximately to the shape of the person, and being arranged above and in line between the hand-holds of the handles. It will be seen that this breast-bar serves as a bearing for the plowman, and by it he may exert a forward pressure to supplement the draft of and steady the movement of the plow. This bar is preferably attached to the rear end of a shank-bar, the forward end of which extends through an eye, 1, on the beam A, forming a pivot or hinge-joint in which the shank may rotate or may swing from side to side. To this bar L is attached a plate, M, which depends alongside of the cross-bar C, and is slotted at $m$, for the passage of a set-screw, N, which turns into the cross-bar and serves to secure the bar L, and consequently the brace-bar, in any suitable adjustment.

The side bars, F, are enlarged or widened centrally between their ends, and are formed at such points with vertically-elongated slots $f$, one edge of each of which has a number of notches, 2, fitted to form slots for the extended journals 3 of the gage-wheel O. By adjusting the gage-wheel into the proper one of seats 2 and securing it therein, the said wheel may be set to cause the shovel to run at any desired depth. To retain the journals 3 in said seats, I prefer to employ the securing-plates P, which have slots $p$, and by preference are formed with notches 4, corresponding to notches or seats 2. Screws Q pass through slots $p$ and into the side plates, F, and serve to secure the plate P in position, and to permit its movement when it is desired to change the position of the gage-wheel.

To the forward end of the front frame I attach a fender, R, which runs in front of the gage-wheel and serves to remove all clods, stones, and the like from its path.

Having thus described my invention, what I claim as new is—

1. The combination, in a plow, of the beam or frame A, the breast-bar provided with a shank, a keeper for receiving the forward end of said shank, whereby the latter may be adjusted rotarily or laterally from side to side at will, and means for securing the rear end of said shank, substantially as set forth.

2. The combination of the beam or frame A, the breast-bar provided with a shank, a keeper-loop, 1, a slotted plate, M, and a clamping-screw, N, substantially as set forth.

3. The combination of the beam, the front frame, the bar D, connecting said beam and frame, the standard and the brace-rod K, all substantially as described, and for the purposes specified.

4. The combination with the side bars or plates having slots $f$, the walls of which are formed with a number of seats, 2, of the wheel, having its journals fitted to enter said seats, and means for securing the journals in said seats, substantially as set forth.

5. The combination of the plates having slots $f$, the walls of which are formed with notches 2, the plates P, having slots $p$ and notches 4, and the screws Q, substantially as set forth.

6. The combination of the beam, the bar D, depending from the front end of same, the front frame secured to the lower end of said bar D, the gage-wheel supported adjustably in said frame, the standard and the brace-rod connected therewith and extended rearwardly and upward and united with the beam, substantially as set forth.

THOMAS JEFFERSON ERWIN.

Witnesses:
 N. D. McLean,
 H. McLean.